United States Patent
Dewald et al.

(10) Patent No.: US 9,195,122 B2
(45) Date of Patent: Nov. 24, 2015

(54) LIGHT MODULATOR SYSTEM INCLUDING RELAY OPTICS FOR CORRECTING OPTICAL DISTORTIONS

(71) Applicant: CHRISTIE DIGITAL SYSTEMS USA, INC., Cypress, CA (US)

(72) Inventors: Duane Scott Dewald, Dallas, TX (US); Nathan Wainwright, Plano, TX (US)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 126 days.

(21) Appl. No.: 14/092,977

(22) Filed: Nov. 28, 2013

(65) Prior Publication Data

US 2015/0146175 A1 May 28, 2015

(51) Int. Cl.

| G02B 13/22 | (2006.01) |
|---|---|
| G03B 5/04 | (2006.01) |
| G03B 21/14 | (2006.01) |
| G02B 27/10 | (2006.01) |
| G02B 27/14 | (2006.01) |
| G02B 27/28 | (2006.01) |
| G02B 5/04 | (2006.01) |
| G02B 13/00 | (2006.01) |

(52) U.S. Cl.
CPC ............... *G03B 21/147* (2013.01); *G02B 5/04* (2013.01); *G02B 13/0095* (2013.01); *G02B 13/22* (2013.01); *G02B 27/1066* (2013.01); *G02B 27/144* (2013.01); *G02B 27/145* (2013.01); *G02B 27/149* (2013.01); *G02B 27/283* (2013.01); *H01S 2301/185* (2013.01)

(58) Field of Classification Search
CPC .. G03B 21/147; G02B 13/22; G02B 27/1066; G02B 27/144; G02B 27/145; G02B 27/149; G02B 27/283; G02B 5/04; G02B 13/0095; G02F 1/1335; H01S 2301/185
See application file for complete search history.

(56) References Cited

U.S. PATENT DOCUMENTS

| 5,345,262 A | 9/1994 | Yee et al. |
|---|---|---|
| 5,597,222 A | 1/1997 | Doany et al. |
| 5,808,797 A | 9/1998 | Bloom et al. |
| 5,828,479 A | 10/1998 | Takano et al. |
| 5,829,858 A | 11/1998 | Levis et al. |
| 5,877,885 A | 3/1999 | Suda et al. |
| 5,907,437 A | 5/1999 | Sprotbery et al. |
| 5,969,347 A | 10/1999 | Takano et al. |
| 6,425,667 B1 | 7/2002 | Haba et al. |

(Continued)

FOREIGN PATENT DOCUMENTS

| EP | 0890863 A2 | 1/1999 |
|---|---|---|
| EP | 0933951 A2 | 8/1999 |

(Continued)

*Primary Examiner* — Jori S Reilly-Diakun
*Assistant Examiner* — Magda Cruz
(74) *Attorney, Agent, or Firm* — Perry + Currier, Inc.

(57) ABSTRACT

A relay lens system is provided. The relay lens system comprises: an air-spaced doublet comprising: a biconvex lens and a negative meniscus lens, an optical axis of the air-spaced doublet offset between the biconvex lens and the negative meniscus lens, each of the biconvex lens, the negative meniscus lens, an air space there between and an offset of the optical axis there between are selected to adjust the coma in an image travelling there through; and, a pair of cylindrical lenses, cylindrical with a relay optical path through the system, each of the pair of cylindrical lenses, and a respective air space there between, selected to adjust the astigmatism in the image.

21 Claims, 14 Drawing Sheets

(56) References Cited

U.S. PATENT DOCUMENTS

| | | |
|---|---|---|
| 6,512,609 B1 | 1/2003 | Klug et al. |
| 6,520,643 B1 | 2/2003 | Holman et al. |
| 6,540,364 B2 | 4/2003 | Takizawa et al. |
| 6,611,282 B1 | 8/2003 | Trubko et al. |
| 6,669,345 B2 | 12/2003 | Yajima |
| 6,719,430 B2 | 4/2004 | Cotton et al. |
| 6,755,540 B1 | 6/2004 | Runco |
| 6,758,565 B1 | 7/2004 | Cobb et al. |
| 6,788,389 B2 | 9/2004 | Fujishima et al. |
| 6,808,269 B2 | 10/2004 | Cobb |
| 6,891,672 B2 | 5/2005 | Whitehead et al. |
| 6,923,546 B2 | 8/2005 | Kurematsu |
| 7,226,168 B2 | 6/2007 | Fuse |
| 7,234,822 B2 | 6/2007 | Uchiyama et al. |
| 7,236,285 B2 | 6/2007 | Uchiyama et al. |
| 7,344,252 B2 | 3/2008 | Fuse |
| 7,394,597 B2 | 7/2008 | Penn |
| 7,443,565 B2 | 10/2008 | Uchiyama et al. |
| 7,445,345 B2 | 11/2008 | Itoh et al. |
| 7,450,310 B2 * | 11/2008 | McGuire ............... 359/630 |
| 8,570,406 B2 | 10/2013 | Kelly et al. |
| 8,699,538 B2 | 4/2014 | Edamura et al. |
| 8,717,492 B2 | 5/2014 | McMackin et al. |
| 8,860,835 B2 | 10/2014 | Kelly et al. |
| 2002/0044261 A1 | 4/2002 | Ouchi et al. |
| 2002/0057419 A1 | 5/2002 | Fujimori et al. |
| 2002/0118709 A1 | 8/2002 | Islam |
| 2002/0122161 A1 | 9/2002 | Nichida et al. |
| 2003/0048393 A1 | 3/2003 | Sayag |
| 2003/0202159 A1 | 10/2003 | Cobb et al. |
| 2004/0184007 A1 | 9/2004 | Silverstein et al. |
| 2004/0263806 A1 | 12/2004 | Silverstein et al. |
| 2005/0041222 A1 | 2/2005 | Haba |
| 2005/0057731 A1 | 3/2005 | Lee et al. |
| 2005/0063184 A1 | 3/2005 | Lee et al. |
| 2005/0162719 A1 | 7/2005 | Ogasawara et al. |
| 2005/0168706 A1 | 8/2005 | Sakai |
| 2005/0185249 A1 | 8/2005 | Uchiyama et al. |
| 2005/0195371 A1 | 9/2005 | Fuse |
| 2005/0195374 A1 | 9/2005 | Akiyama |
| 2005/0264879 A1 | 12/2005 | Deter et al. |
| 2005/0270618 A1 | 12/2005 | Uchiyama et al. |
| 2007/0126992 A1 | 6/2007 | Penn |
| 2007/0177275 A1 * | 8/2007 | McGuire, Jr. ............... 359/630 |
| 2010/0165308 A1 | 7/2010 | Morikuni et al. |
| 2010/0254000 A1 | 10/2010 | Huhse et al. |
| 2010/0328631 A1 | 12/2010 | Nishida et al. |
| 2013/0300948 A1 | 11/2013 | Jannard et al. |
| 2014/0333737 A1 | 11/2014 | Richards |
| 2015/0022789 A1 | 1/2015 | Noriyuki Sato |
| 2015/0124330 A1 * | 5/2015 | Ito et al. ............... G02B 13/00 |
| 2015/0124337 A1 * | 5/2015 | Ito et al. ............... G02B 13/00 |

FOREIGN PATENT DOCUMENTS

| | | |
|---|---|---|
| EP | 0961502 A2 | 12/1999 |
| EP | 0798935 B1 | 1/2002 |
| EP | 1306715 A1 | 5/2003 |
| EP | 1549056 A2 | 6/2005 |
| WO | 2015023762 A2 | 2/2015 |

* cited by examiner

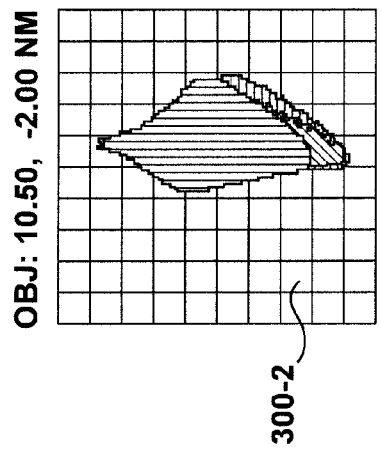
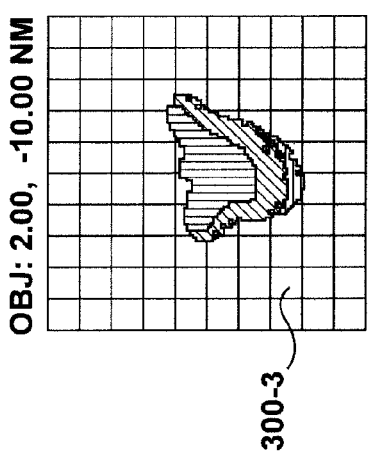
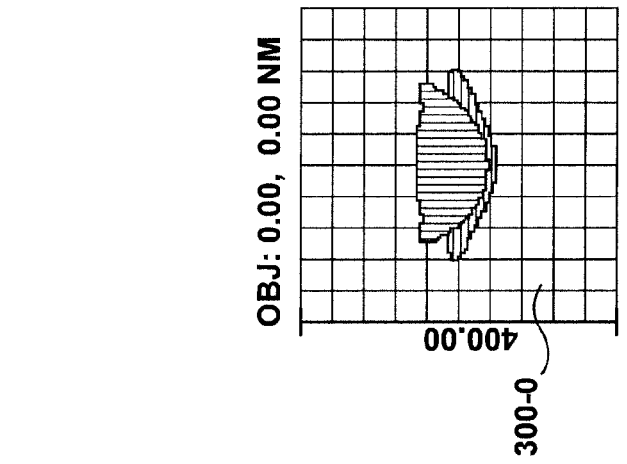
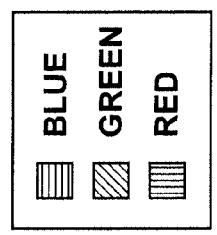
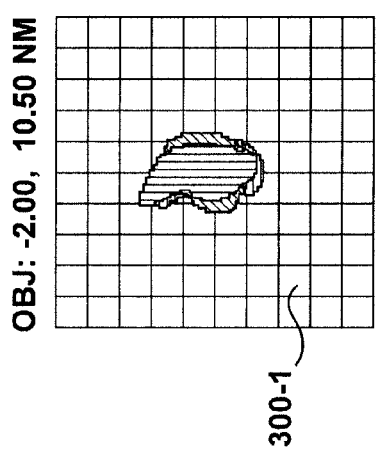
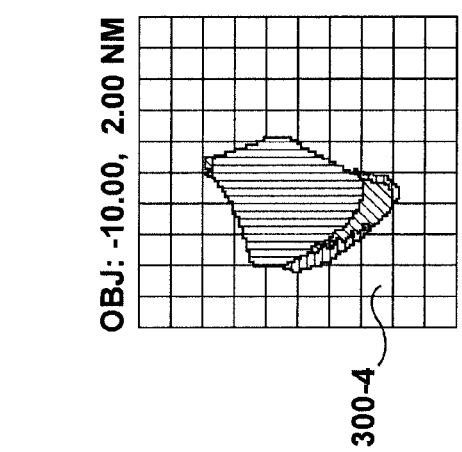
FIG. 3

LIGHT MODULATOR SYSTEM INCLUDING RELAY OPTICS FOR CORRECTING OPTICAL DISTORTIONS

FIELD

The specification relates generally to relay lenses, and specifically to a light modulator system including relay optics for correcting optical distortions.

BACKGROUND

High dynamic range projectors can attain the desired high dynamic range using a first light modulator providing a low resolution image and a second light modulator providing a higher resolution version of a similar image. A relay lens system there between relays the low resolution image formed at the first light modulator to the second light modulator. Certain advantages can be achieved by having light input to the first light modulator at a normal angle to the first light modulator, and the lower resolution image formed thereby relayed to the second light modulator at an off-normal angle to the first light modulator. Further, the lower resolution image is input to the second light modulator at the off-normal angle, so that the higher resolution final image formed by the second light modulator is relayed and/or reflected at a normal angle into projection optics. However this leads to a difference in light path length in different areas of the lower resolution image as it is relayed to the second light modulator, introducing optical distortions and the like into the lower resolution image.

SUMMARY

In general, this disclosure is directed to a system for a high dynamic range (HDR) projector, the system including relay optics that compensates for optical variations in the image introduced by a first light modulator and a second light modulator being at off-normal angles to the optical path of the relay optics. Specifically, the relay optics include lenses that compensate for coma and astigmatism in the image by deliberately introducing coma and astigmatism into the image in a manner that compensates for the coma and astigmatism introduced by the off-normal arrangement of the light modulators, which in this case represent the object and image planes of the optical system.

In this specification, elements may be described as "configured to" perform one or more functions or "configured for" such functions. In general, an element that is configured to perform or configured for performing a function is configured to perform the function, or is suitable for performing the function, or is adapted to perform the function, or is operable to perform the function, or is otherwise capable of performing the function.

An aspect of the present specification provides a system comprising: a first light modulator, a second light modulator, and relay optics there between, each of the first light modulator and the second light modulator at an off-normal angle to a relay optical path through the relay optics such that some portions of an image, formed by the first light modulator, are relayed through the relay optics to the second light modulator, at different path respective path lengths than other portions of the image, thereby introducing coma and astigmatism into the image, the relay optics comprising: an air-spaced doublet comprising: a biconvex lens and a negative meniscus lens, an optical axis of the air-spaced doublet offset between the biconvex lens and the negative meniscus lens, each of the biconvex lens, the negative meniscus lens, an air space there between and an offset of the optical axis there between are selected to adjust the coma in the image; and, a pair of cylindrical lenses, cylindrical with the relay optical path, each of the pair of cylindrical lenses, and a respective air space there between, selected to adjust the astigmatism in the image.

A concave side of the negative meniscus lens can be adjacent the biconvex lens.

A curvature of a side of negative meniscus lens, closest to the biconvex lens, can be about complimentary with an adjacent side of the biconvex lens.

Each of the biconvex lens, the negative meniscus lens, an air space there between and the offset there between can be selected to adjust the coma in the image by introducing respective coma into the image in a direction opposite the coma in the image introduced by the off-normal angle.

One of the biconvex lens and the negative meniscus lens can be cylindrical with the relay optical path.

The biconvex lens can comprise opposite sides of different curvatures.

The air space between the air-spaced doublet can be one or more of about 2 mm and between about 1 mm and about 10 mm.

The pair of cylindrical lenses can be located between the air-spaced doublet and the second light modulator.

The system can further comprise apparatus for adjusting a size of the respective air space between the pair of cylindrical lenses.

Each of the pair of cylindrical lenses, and the respective air space there between, can be selected to adjust the astigmatism in the image between a center of the image and corners of the image.

A first cylindrical lens, of the pair of cylindrical lenses, can comprise a plano-concave cylindrical lens, and a second cylindrical lens, of the pair of cylindrical lenses, can comprise a plano-convex cylindrical lens. A respective concave side and a respective convex side of each of the pair of cylindrical lenses can face towards each other.

The respective air space between the pair of cylindrical lenses can be between about 3 mm and about 10 mm.

The relay optics can further comprise a pair of meniscus aspheric lenses, cylindrical with the relay optical path, the air-spaced doublet and the pair of cylindrical lenses located between the pair of meniscus aspheric lenses, the pair of meniscus aspheric lenses selected to control one or more of spherical aberration, field curvature and prismatic colour separation of the image being relayed through the relay optics. The aspheric meniscus lenses can be identical to each other. A respective convex side of each of the meniscus aspheric lenses can face towards each other.

The system can further comprise a first set of prisms configured to: relay input light to the first light modulator at a normal angle and relay the image from the first light modulator at the off-normal angle.

The system can further comprise a second set of prisms configured to: relay the image from the relay optics to the second light modulator at the off-normal angle and relay a respective image formed at the second light modulator out of the system at a normal angle.

The off-normal angle can be one or more of between about 24° and about 28°, and at about 26°.

The relay optics can further comprise a reflector for rotating the image by about 90° along the relay optical path. The reflector can be located between the air-spaced doublet and the pair of cylindrical lenses.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 3 depicts spot sizes at the center and corners of the second light modulator of the system of FIG. 1, according to non-limiting implementations.

DETAILED DESCRIPTION

Figure 1:
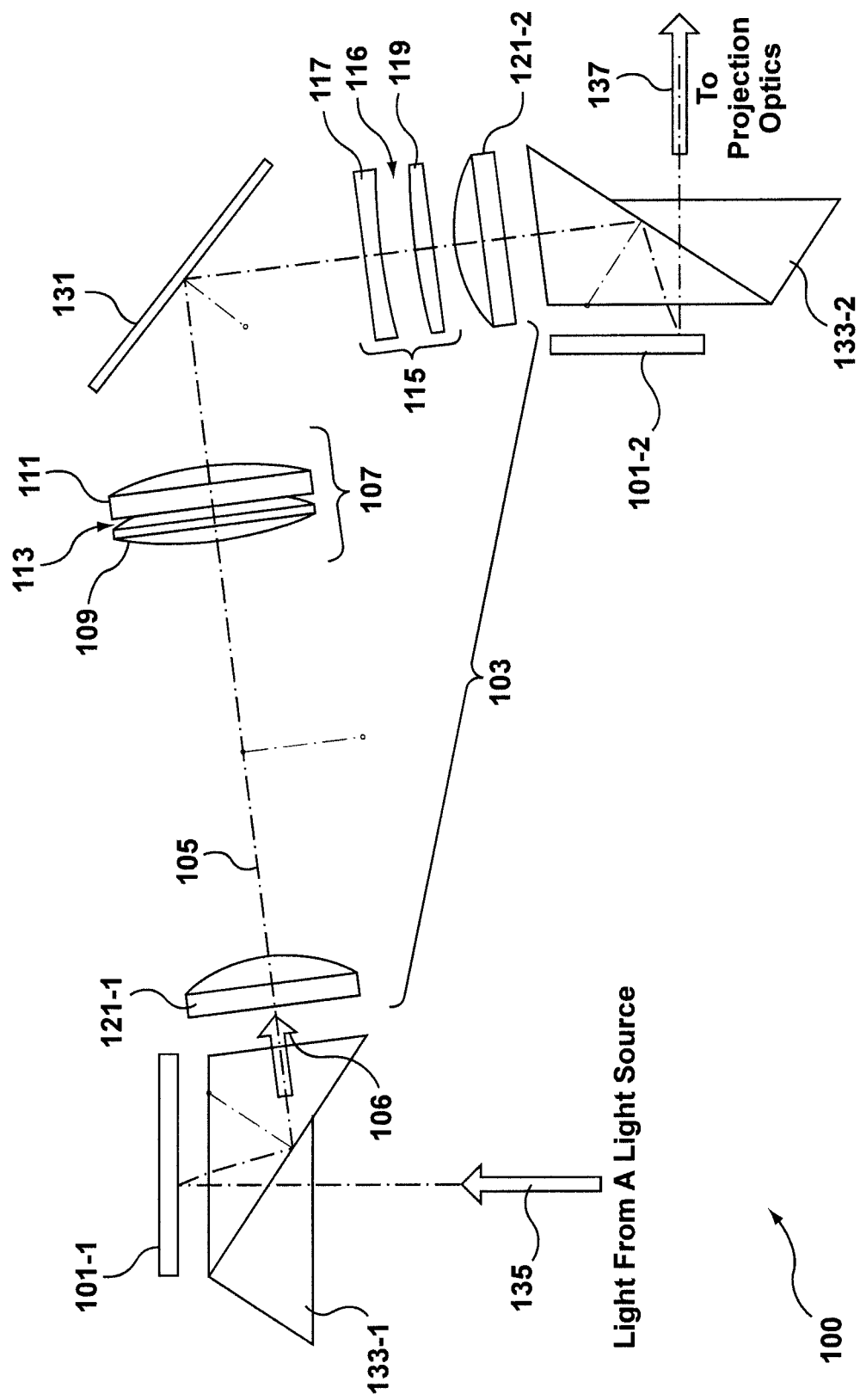
FIG. 1 depicts a light modulator system including relay optics for correcting optical distortions, according to non-limiting implementations.

FIG. 1 depicts a system 100 comprising: a first light modulator 101-1, a second light modulator 101-2, and relay optics 103 there between, each of first light modulator 101-1 and the second light modulator 101-2 at an off-normal angle to a relay optical path 105 through relay optics 103 such that some portions of an image 106, formed by first light modulator 101-1, are relayed through relay optics 103 to second light modulator 101-2, at different path respective path lengths than other portions of image 106, thereby introducing coma and astigmatism into image 106.

Relay optics 103 comprise: an air-spaced doublet 107 comprising: a biconvex lens 109 and a negative meniscus lens 111, an optical axis (see FIG. 2) of the air-spaced doublet is offset between biconvex lens 109 and negative meniscus lens 111, each of the biconvex lens 109, negative meniscus lens 111, an air space 113 there between and the offset of the optical axis there between are changed and/or selected to adjust the coma in image 106. Each of biconvex lens 109 and negative meniscus lens 111 are spherical.

Relay optics 103 further comprises: a pair of cylindrical lenses 115, cylindrical with relay optical path 105, each of the pair of cylindrical lenses 115, and a respective air space 116 there between, selected to adjust the astigmatism in image 106. In some implementations, as depicted, a first cylindrical lens 117, of the pair of cylindrical lenses 115, comprises a plano-concave cylindrical lens, and a second cylindrical lens 119, of the pair of cylindrical lenses 115, comprises a plano-convex cylindrical lens. In some implementations, as depicted, a respective concave side and a respective convex side of each of the pair of cylindrical lenses 115 face towards each other. A long axis of each of the pair of cylindrical lenses 115 is appreciated to be "out of the page" with respect to FIG. 1.

In general, pair of cylindrical lenses 115 can be located between air-spaced doublet 107 and second light modulator 103-2.

In some implementations, as depicted, relay optics 103 further comprises a pair of meniscus aspheric lenses 121-1, 121-2, cylindrical with relay optical path 105, air-spaced doublet 107 and pair of cylindrical lenses 115 located between the pair of meniscus aspheric lenses 121-1, 121-2, pair of meniscus aspheric lenses 121-1, 121-2 selected to control one or more of spherical aberration, field curvature, and prismatic colour separation of image 106 being relayed through relay optics 103. As depicted, a respective convex side of each of the pair of meniscus aspheric lenses 121-1, 121-2 face towards each other.

In some implementations, as depicted in FIG. 1, relay optics 103 further comprises a reflector 131 for rotating image 106 by about 90° along relay optical path 105. As depicted, reflector 131 can be located between air-spaced doublet 107 and the pair of cylindrical lenses 115. Alternatively, reflector 131 can be located between meniscus aspheric lens 121-1 and air-spaced doublet 107.

In depicted implementations, system 100 further comprises a first set of prisms 133-1 configured to: relay input light 135 to first light modulator 101-1 at a normal angle; and relay image 106 from first light modulator 101-1 at the off-normal angle. As depicted, system 100 further comprises a second set of prisms 133-2 configured to: relay image 106 from relay optics 103 to second light modulator 101-2 at the off-normal angle; and relay a respective image 137 formed at second light modulator 101-2 out of system 100 at a normal angle.

First light modulator 101-1 and second light modulator 101-2 will be interchangeably referred to hereafter, collectively, as light modulators 101 and, generically, as a light modulator 101. Meniscus aspheric lenses 121-1, 121-2 will be interchangeably referred to hereafter, collectively, as meniscus aspheric lenses 121 and, generically, as a meniscus aspheric lens 121. First set of prisms 133-1 will be interchangeably referred to hereafter as prisms 133-1. Second set of prisms 133-2 will be interchangeably referred to hereafter as prisms 133-2. Prisms 133-1, 133-1 will be interchangeably referred to hereafter, collectively, as prisms 133.

In any event, light 135 from a light source (not depicted), including, but not limited to, one or more of light emitting diode (LED) light sources, laser light sources, arc lamps and the like, impinges on first light modulator 101-1 via prisms 133-1 at a normal angle (e.g. about 90°), and light 135 is modulated by first light modulator 101-1 to form image 106. Image 106 travels away from first light modulator 101-1 at an off-normal angle. FIG. 1 hence further depicts a path of light 135 and/or image 106 at each of light modulators through prisms 133 as image 106 reflects from the internal surfaces of prisms 133. Indeed, a path of light 135 and/or images 106, 137 through prisms 133 is also depicted in FIG. 1.

Figure 2:
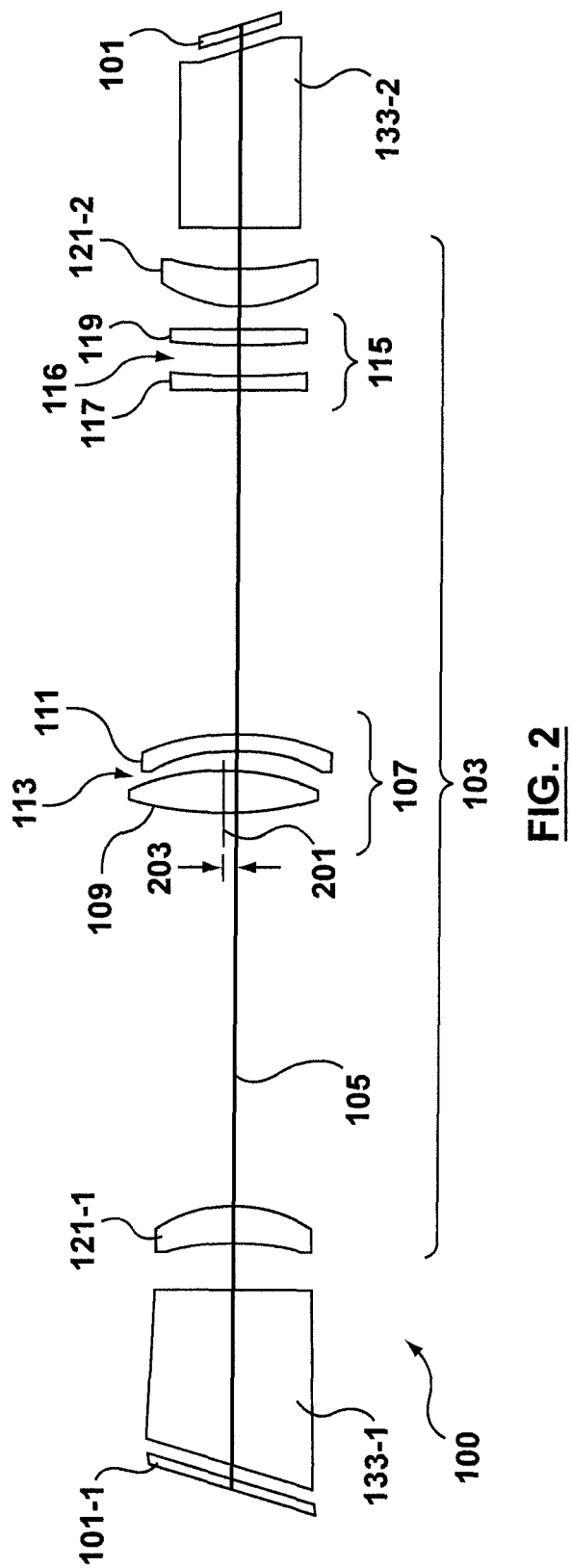
FIG. 2 depicts a simplified version of the system of FIG. 1, according to non-limiting implementations.

For example, each of light modulators 101 can comprise one or more of a phase modulator, a light modulator, a reflective light modulator, a transmissive light modulator, a liquid crystal on silicon (LCOS) device, a digital micromirror device (DMD), and the like. Indeed, system 100 can be specific to DMD based types of projectors, and/or any microelectromechanical (MEMS)-based projection and/or any multimode deformable mirror (MDMS)-based projection. When each of light modulators 101 comprise a DMD, the off-normal angle can comprise about 26° and/or can be between about 24° and about 28°, a tilt angle of mirrors in some DMDs, though other DMDs and other off-normal angles are within the scope of present implementations. Furthermore, each of light modulators are centered on an optical path through system 100 (including relay path 105), as best seen in FIG. 2 which depicts system 100 with an optical path there through unfolded. In some implementations a size of light modulator 101-1 can about match a size of light modulator 101-2. It is further appreciated that, in prior DMD projectors, light illuminates the DMD from an off-normal angle (for example about 24° to about 28° to normal) and is projected at a normal angle (i.e. about 0°). However, in present implementations, first light modulator 101-1 (which can also be referred to as a pre-modulator) is illuminated at a normal angle (i.e. at about 0°) and hence images formed using first light modulator 101-1 (which can also be referred to as "pre-modulated" images) are projected at the off-normal angle. The pre-modulated images then arrive at second light modulator 101-2 (which can also be referred to as the prime modulator), via relay optics 103, at the off-normal angle, and second light modulator 101-2 then projects images formed thereby at a normal angle.

Further, each of prisms 133 can comprise a wedge prism. For example, prisms 133-1 can comprise two wedge prisms that are positioned relative to one another, to respectively direct light 135 to first light modulator 101-1 at a normal angle, and direct image 106 to relay optics 103. For example, one or more surfaces within prisms 133-1 can be at a total internal reflection (TIR) angle to a path of image 106 there through; hence, as image 106 is received at the surface, the surface reflects image 106 towards relay optics along relay optical path 105; the surface is not, however, at a TIR angle to light 135, so that light 135 passes there through to first light modulator 101-1 at a normal angle. A similar prism structure is described in Applicant's co-pending application entitled "Two-stage Light Modulation for High Dynamic Range" to Michael Perkins, Duane Scott Dewald and Nathan Wainwright and filed on Nov. 4, 2013 with application Ser. No. 14/070,627.

Image 106 then passes through relay optics 103 to second light modulator 101-2 via prisms 133-2, which are similar to prisms 133-1, but arranged as a mirror image to prisms 133-1. Hence, prisms 133-2 also include a surface at a TIR angle to an optical path of image 106 there through, and hence the surface is configured to reflect image 106 towards second light modulator 101-2, and relay respective image 137 formed at second light modulator 101-2 out of system 100 at a normal angle, for example to projection optics (not depicted) of a projector.

In some implementations, reflector 131, when present, can be used to align and/or rotate image 106 to align with second light modulator 101-2. For example, in specific non-limiting implementations, as depicted, each light modulator 101 can be rectangular and hence image 106 is also rectangular. The geometry of system 100 is such that, if relay optics 103 did not include reflector 131, the rectangular image 106 would be at 90° to second light modulators 103-2. Hence, reflector 131 is generally configured to rotate image 106 by 90°. Reflector 131 can include, but are not limited to fold mirrors, prisms, dove prisms, and the like. While FIG. 1 depicts only one reflector 131, in other implementations, relay optics 103 can comprise more than one reflector 131, and specifically an odd number of reflectors, to correct for the 90° misalignment. An odd number of reflectors 131 will have the same effect as one reflector 131. Hence, relay optics 103 can further comprise an odd number of reflectors 131 configured to relay the image 106 along relay optical path 105 and/or towards second light modulator 101-2.

Further, while reflector 131 is depicted as being between air-spaced doublet 107 and pair of cylindrical lenses 115, an odd number of reflectors 131 can be located anywhere between prisms 133-1, 133-2 that does not interfere with the optics of other components of relay optics 103. Indeed, when relay optics 103 comprises more than one reflector 131, the different reflectors 131 can be located between different components of relay optics 103. Alternatively, an odd number of reflectors 131 can be located external to relay optics 103, and the 90° turn in image 106 can be introduced prior to image 106 entering relay optics 103, and/or after light exits relay optics 103.

In specific non-limiting implementations, system 100 operates at an f-number of about f/2.4. Because both the image and object planes (i.e. first light modulator 101-2 and second light modulator 101-2, respectively) are tilted from normal (e.g. about 26°), system 100 is a semi-symmetrical Schiempflug optical system. Furthermore, system 100 is generally telecentric, and can include optical components to ensure that light entering relay optics 103 is telecentric; due to the telecentric nature, keystone distortion is eliminated, so the major optical distortions introduced into image 106, and/or final image 137, are coma, astigmatism, field curvature, and prismatic color separation.

Components of relay optics 103 can hence be selected to compensate for these optical distortions. For example, air-spaced doublet 107 generally compensates for coma while pair of cylindrical lenses 115 generally compensates for astigmatism. However, as will be shown hereafter, air-spaced doublet 107, pair of cylindrical lenses 115, and optionally pair of meniscus aspheric lenses 121, in combination, can all contribute to correcting optical distortions introduced by the semi-symmetrical Schiempflug nature of light modulators 101 and prisms 133. Further, in general, the Schiempflug nature of light modulators 101 and prisms 133 allows the plane of the image, object, and principal plane of system 100 to intersect. In a system with relatively low magnification, for example about 2:1, using identical prisms 133 in image and object space, system 100 can be somewhat symmetric.

In any event, system 100 is now described in more detail with reference to FIG. 2, which depicts a simplified version of FIG. 1, with like elements having like numbers, and components of system 100 depicted in cross-section through a plane perpendicular to relay optical path 105. FIG. 2 is simplified from FIG. 1 in that reflector 131 is not depicted, and details of a light path in each of prisms 133 are not depicted. Rather, only relay optical path 105 is depicted as extending in a straight line through relay optics 103. It is appreciated that the line representing relay optical path 105 is connected at both ends to an optical path at light modulators 101 and through each of prisms 133. In other words, the optical path through system 100 in FIG. 2 is unfolded, and the effect of each set of prisms 133 is represented by a block of glass with unequal optical path lengths there through.

FIG. 2 further shows that each light modulator 101 is rotated about an axis that is perpendicular to the unfolded optical path through system 100; with specific reference to FIG. 2, each light modulator 101 is rotated, through the off-normal angle, about an axis that is "out of the page", and perpendicular to relay optical path 105.

FIG. 2 further shows that one of biconvex lens 109 and negative meniscus lens 111 is cylindrical with relay optical path 105, while the other of biconvex lens 109 and negative meniscus lens 111 is offset from relay optical path 105, by an offset 203, and specifically perpendicularly offset from relay optical path 105. Hence, an optical axis 201 of air-spaced doublet 107, for example an optical axis if negative meniscus lens 111, is offset between biconvex lens 109 and negative meniscus lens 111. Specifically, as depicted, biconvex lens 109 is offset from relay optical path 105, and negative meniscus lens 111 is cylindrical with relay optical path 105. However, in other implementations, biconvex lens 109 can be cylindrical with relay optical path 105, and negative meniscus lens 111 can be offset from relay optical path 105: for example, with regard to FIG. 2, air-spaced doublet can be shifted "down" and perpendicular to relay optical path 105 until biconvex lens 109 is cylindrical with relay optical path 105, though the term "down" is appreciated to be with respect to FIG. 2 only, and not with respect to the ground. In general, regardless of which of biconvex lens 109 and negative meniscus lens 111 is cylindrical with relay optical path 105, offset 203 is both perpendicular to relay optical path 105 and perpendicular to an axis of rotation of each light modulator 101 along the unfolded optical path through system 100. In general, each of biconvex lens 109, negative meniscus lens 111, air space 113 there between and offset 203 there between are selected to adjust the coma in image 106 by introducing respective coma into image 106 in a direction opposite the coma in image 106 introduced by the off-normal angle.

There are various degrees of freedom when selecting each of biconvex lens 109, negative meniscus lens 111, air space 113 there between and offset 203 there between. For example, as depicted, biconvex lens 109 comprises opposite sides of different curvatures, though each side could have the same curvature. Further, a concave side of negative meniscus lens 111 is adjacent biconvex lens 109. In some implementations, a curvature of a side of negative meniscus lens 111, closest to biconvex lens 109, is about complimentary with an adjacent side of biconvex lens 109, though the sides need not be complimentary to each other. Further, air space 113, and offset 203 can be selected and/or adjusted. In some implementations, air space 113 of air-spaced doublet 107 is about 2 mm, and offset 203 is between about 0.1 mm and about 5 mm. Further, air space 113 of air-spaced doublet 107 can be between about 1 mm and about 10 mm. However, neither air space 113 nor offset 203 is shown to scale in FIG. 2.

There are further various degrees of freedom when selecting each of pair of cylindrical lenses 115, and respective air space 116 there between. Specifically, each of pair of cylindrical lenses 115, and respective air space 116 there between are selected to adjust the astigmatism in image 106 between a center of image 106 and corners of image 106. For example, curvatures of each of first cylindrical lens 117 and second cylindrical lens 119 can be selected to adjust astigmatism. Respective air space 116 between the pair of cylindrical lenses 115 can also be adjusted. For example, respective air space 116 can be between about 3 mm and about 7 mm. Furthermore, a cylindrical axis of each of the pair of cylindrical lenses 115 is generally perpendicular to a direction of offset between air-spaced doublet 107, with respect to relay path 105.

It is yet further appreciated from FIG. 2, that pair of cylindrical lenses have a long axis that is perpendicular to relay optical path 105 and parallel to the axis of rotation of each light modulator 101 in the unfolded optical path through system 100.

In some implementations, system 100 can comprise apparatus (not depicted) for adjusting a size of respective air space 116 between pair of cylindrical lenses 115, and/or apparatus (not depicted) for adjusting a size of air space 113 at air-spaced doublet 107 and/or apparatus (not depicted) for adjusting a size offset 203.

There are yet further various degrees of freedom when selecting each of meniscus aspheric lenses 121. For example, curvatures of each of each of meniscus aspheric lenses 121 can be selected to adjust one or more of spherical aberration, field curvature and prismatic colour separation.

In some implementations, adjustments to the various components of system 100 can be made once, and their various positions locked down, for example when system 100 is provisioned. In other implementations, the adjustments to the various components of system 100 can be made after system 100 is provisioned and/or after system 100 is deployed, for example as the various components age and their properties change, and/or as their positions shift due to movement of system 100 (e.g. an HDR projector).

In some implementations, components and/or properties and/or positions of components of relay optics 103 can be selected through trial and error; and/or components and/or properties and/or positions of components of relay optics 103 can be selected using optical modelling software. It is appreciated that for different sizes of light modulators 101, and/or different relative sizes of light modulators 101 can lead to using different components and/or properties and/or positions of components of relay optics 103.

In specific non-limiting implementations, first light modulator 101-1 comprises a 2K-DMD and a corresponding second light modulator 101-2 comprises a 4K-DMD, rotated by 90° with respect to first light modulator 103-1 along a light path through system 100, such as relay optical path 105. Hence, in these implementations, and other implementations where light modulators 101 are of different sizes, relay optics 103 can further comprise lenses and/or components for magnifying image 106 between light modulators 101. The magnification can be: greater than one, or less than one. The magnification can also be about one when light modulators 101 are about the same size.

The effect of air-spaced doublet 107, pair of cylindrical lenses 115 and meniscus aspheric lenses 121 on image 106 is now described with respect to FIGS. 3 to 14. FIGS. 3, 5, 7, 9, 11, and 13 each depict plots of red, green and blue spot sizes of points in image 106 at a center and corners of second light modulator 101-2, when various components of relay optics 103 are changed and/or removed from system 100; FIGS. 4, 6, 8, 10, 12 and 14 each depict tangential (left side) and sagittal (right side) ray fan plots of red, green and blue light at each of the same points as in FIGS. 3, 5, 7, 9, 11, and 13, and under the same conditions. Further, the blue spot size and ray fan plots is for a wavelength of light at about 460 nm, the green spot size and ray fan plots is for a wavelength of light at about 540 nm, the red spot size and ray fan plots is for a wavelength of light at about 620 nm.

It is further appreciated that the goal of selecting components of relay optics 103 is for each spot to be aligned at their respective positions, and for each spot to be within an "acceptable" size; the "acceptable" size can change depending on the conditions introduced into system 100 by selection and/or constraints of light modulators, an f-number of system 100, prisms 133, the off-normal and the like, though the goal is to reduce coma and astigmatism, introduced into image 106 by light modulators 101 being at the off-normal angle.

Where a particular colour of spot in each of FIGS. 5, 7, 9, 11, and 13 is not visible in a given plot, the particular colour is assumed to be smaller than the other spot sizes.

In any event, attention is first directed to FIG. 3 which depicts plots of red, green and blue spot sizes of light rays at each of a center and corners of second light modulator 101-2 of system 100 with air space 113 being about 2 mm, air space 116 being about 4 mm, and offset 203 being about 0.2 mm. Table 1 provides a "prescription" for relay optics 103 as modelled in FIG. 3:

TABLE 1

| Surface | Element | Lens Type | Radius | Thickness | Glass | Conic |
|---|---|---|---|---|---|---|
| 1 | 121-1 Front | ASPHERIC | −90 | 12 | BK7 | 0 |
| 2 | 121-1 Back | ASPHERIC | −42.9 | 126.1275 | | −0.41 |
| Offset of 109 with respect to 121-1 | | | | Y = 0.2 mm | | |
| 3 | 109 Front | SPHERICAL | 121.7 | 15 | S-FSL5 | 0 |
| 4 | 109 Back | SPHERICAL | −60 | 2 | | 0 |
| Offset of 109 with respect to 111 | | | | Y = −0.2 mm | | |
| 5 | 111 Front | SPHERICAL | −57.77 | 5 | S-TIH6 | 0 |
| 6 | 111 Back | SPHERICAL | −90 | 112.514 | | 0 |
| 7 | 117 Front | TOROIDAL | Infinity | 5 | BK7 | 0 |
| 8 | 117 Back | TOROIDAL | 254.3 | 9.786521 | | 0 |
| 9 | 119 Front | TOROIDAL | 254.3 | 5 | BK7 | 0 |
| 10 | 119 Back | TOROIDAL | Infinity | 2.213479 | | 0 |
| 11 | 121-2 Front | ASPHERIC | 42.9 | 12 | BK7 | −0.41 |
| 12 | 121-2 Back | ASPHERIC | 90 | 13 | | 0 |

The values in Table 1 are in millimeters (mm). Further, in Table 1 the terms "front" and "back" are used with respect to image travelling from first light modulator 101-1 to second light modulator 101-2 through relay optics 103 along relay optical path 105, and each surface number is used provided with respect to relay optical path 105. Hence, as the image enters relay optics 103, the image first interacts with a "front" of meniscus aspheric lenses 121-1 and then a "back" of meniscus aspheric lenses 121-1. Further, the term "TOROIDAL" in Table 1 refers to pair of cylindrical lenses 115. Each of lenses 109, 111 are spherical as described above. Each of terms "BK7", "S-FSL5", "S-TIH6" refer to a type of glass used for each respective lens.

Plot 300-0 is at a center of second light modulator 101-2, and plots 300-1, 300-2, 300-3 and 300-4 are at corners of second light modulator 101-2. Plots 300-0, 300-1, 300-2, 300-3, 300-4 will be interchangeably referred to hereafter, collectively, as plots 300 and generically as a plot 300. Further, both the x-axis and y-axis of each plot in FIG. 3 is over a range of about 400 µm.

In any event, each of red, green and blue spot sizes are considered to be within an acceptable size for each of plots 300, and further have acceptable amount of coma, astigmatism and spherical aberration. For example, in some implementations, light leaving any given point on first light modulator 101-1 is focused such that all the light is collected into a spot less than about 200 microns in diameter at second light modulator 101-2. In other words, an acceptable size can be less than about 200 microns. Further, the area of each spot is configured to about the same size, within about 10% and/or relatively equal over the area of second light modulator 101-2.

Figure 4:
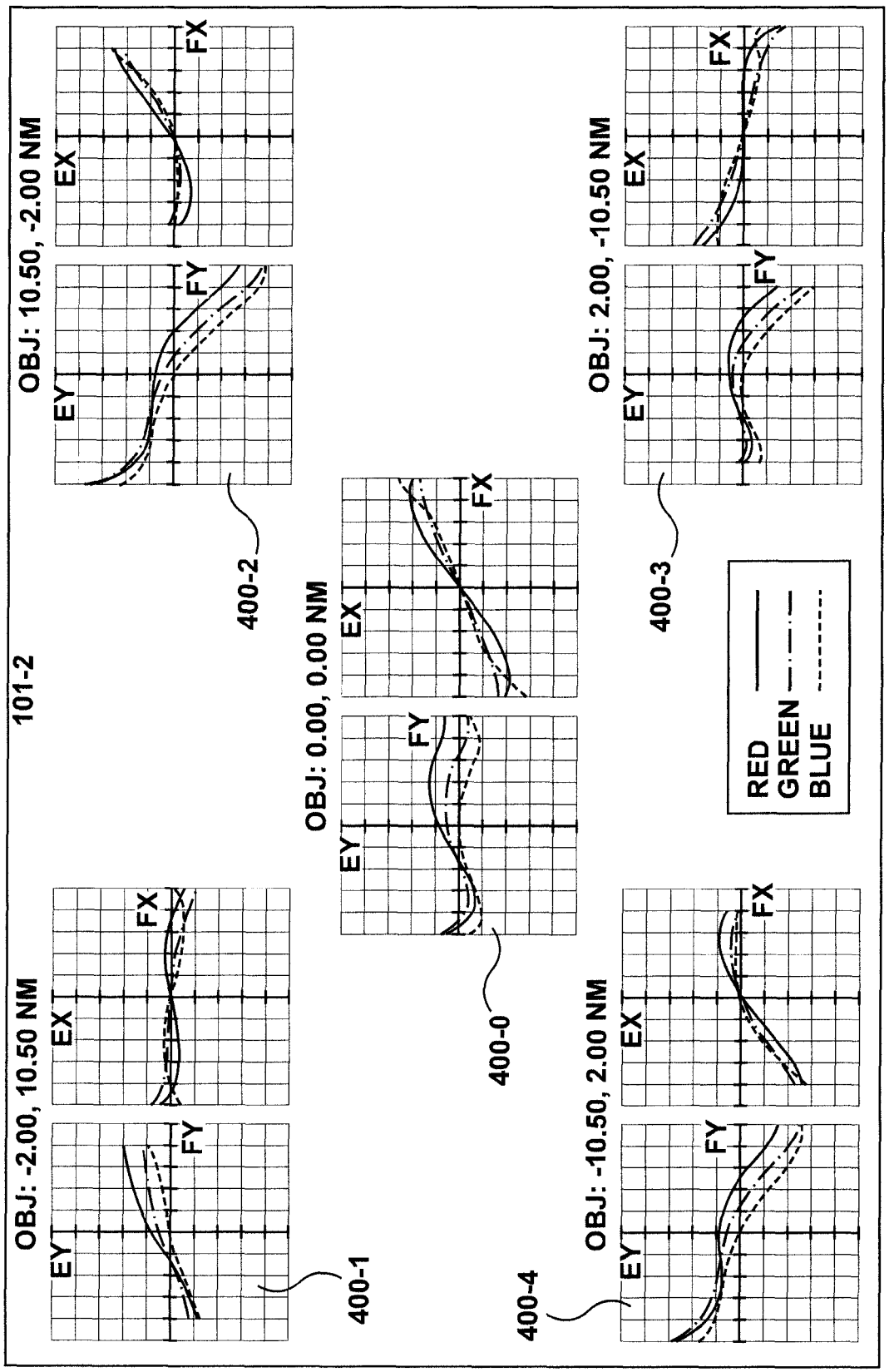
FIG. 4 depicts ray fan plots at the center and corners of the second light modulator of the system of FIG. 1, according to non-limiting implementations.

Similarly, attention is next directed to FIG. 4, which depicts tangential and sagittal ray fan plots for each of the spots and/or plots 300 of FIG. 3. Hence, Plot 400-0 is at a center of second light modulator 101-2, and plots 400-1, 400-2, 400-3 and 400-4 are at corners of second light modulator 101-2. Plots 400-0, 400-1, 400-2, 400-3, 400-4 will be interchangeably referred to hereafter, collectively, as plots 400 and generically as a plot 400. Further, both the x-axis and y-axis of each plot in FIG. 4 is over a range of about +/−200 µm.

In any event, each of red, green and blue ray fan plots for each of the tangential and sagittal planes are considered an acceptable level of variation for each of plots 400, and further have acceptable amount of coma, astigmatism and spherical aberration. However, plots 400 further show that some spherical aberration is introduced in order to have spherical aberration of image 106 at second light modulator 101-2 in order to selectively illuminate second light modulator 101-2 when producing final image 137.

Figure 5:
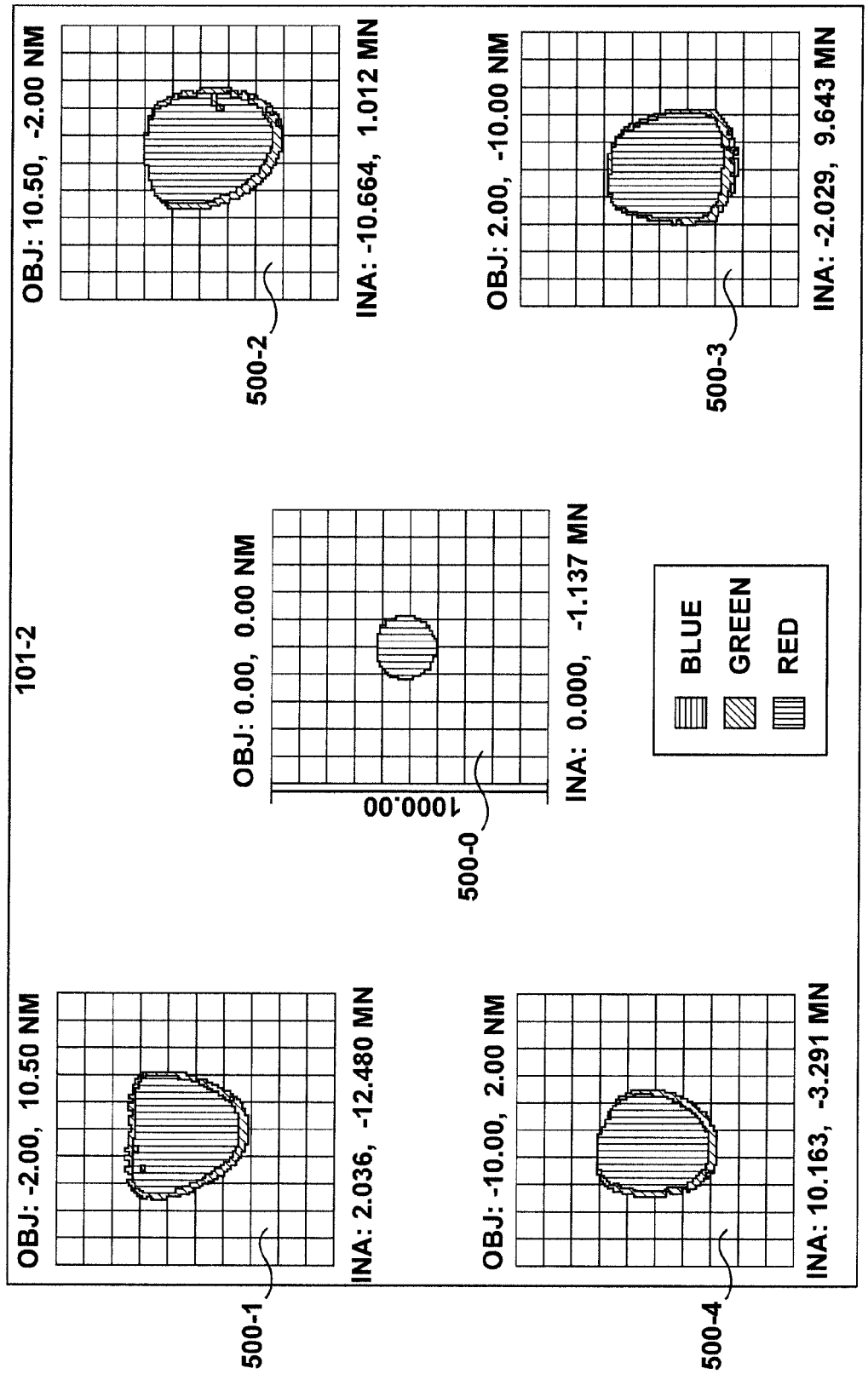
FIG. 5 depicts spot sizes at the center and corners of the second light modulator of the system of FIG. 1, with the pair of meniscus aspheric lenses removed and replaced with spherical meniscus lenses, according to non-limiting implementations.

Attention is next directed to FIG. 5 which depicts plots of red, green and blue spot sizes of light rays at each of a center and corners of second light modulator 101-2, when meniscus aspheric lenses 121 are removed from relay optics 103 and replaced with spherical meniscus lenses; components of system 100 are otherwise similar to those of FIGS. 3 and 4, described above. Plot 500-0 is at a center of second light modulator 101-2, and plots 500-1, 500-2, 500-3 and 500-4 are at corners of second light modulator 101-2. Plots 500-0, 500-1, 500-2, 500-3, 500-4 will be interchangeably referred to hereafter, collectively, as plots 500 and generically as a plot 500. Further, both the x-axis and y-axis of each plot in FIG. 5 is over a range of about 1000 µm.

Figure 6:
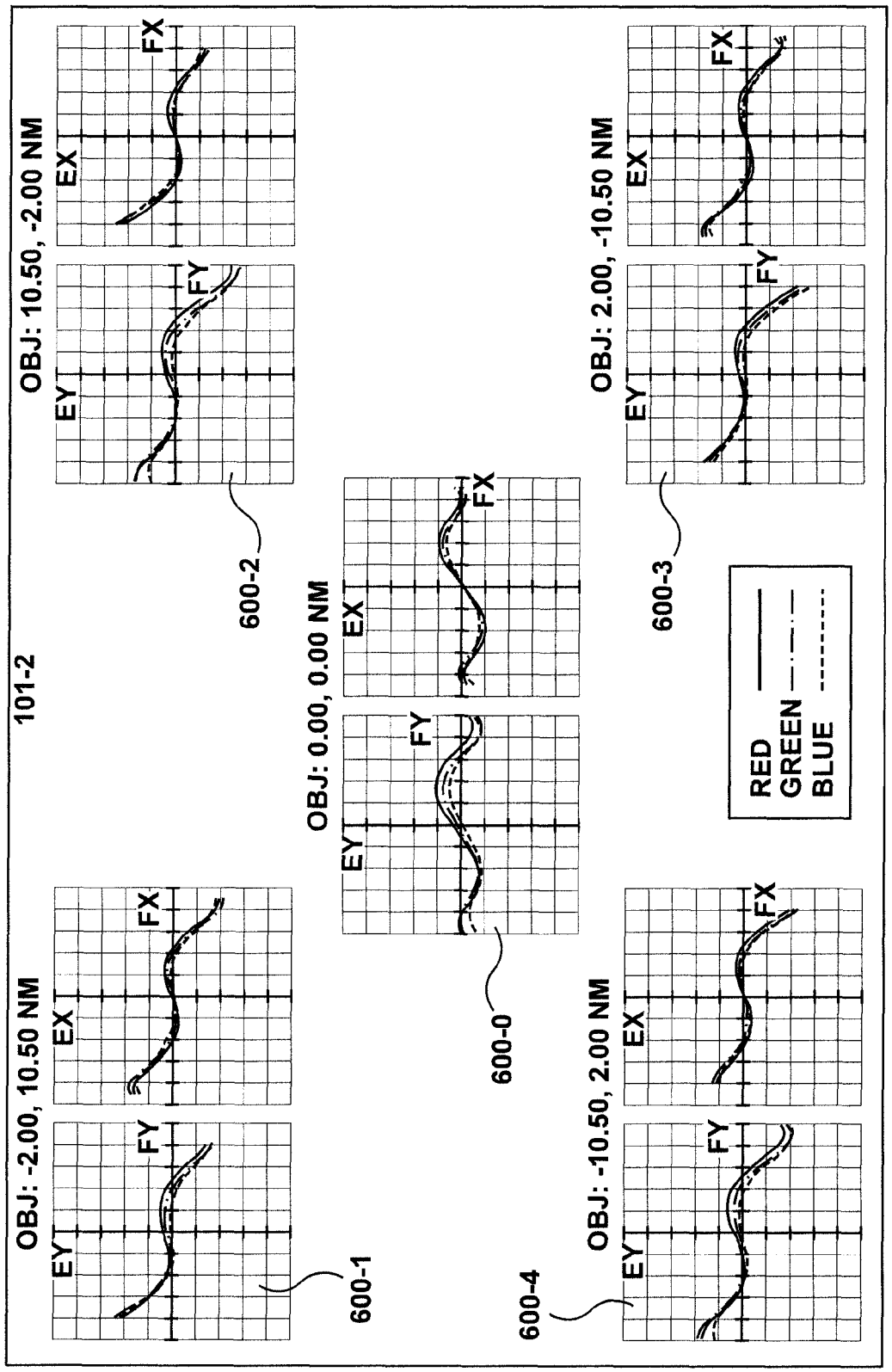
FIG. 6 depicts ray fan plots at the center and corners of the second light modulator of the system of FIG. 1, with the pair of meniscus aspheric lenses removed and replaced with spherical meniscus lenses, according to non-limiting implementations.

The effect of eliminating the aspherical shape of the meniscus lens results in larger spot sizes. This is due to the inability of the spherical surface of the spherical meniscus lenses to correct aberrations, as described below Similarly, attention is next directed to FIG. 6, which depicts tangential and sagittal ray fan plots for each of the spots and/or plots 500 of FIG. 5. Hence, Plot 600-0 is at a center of second light modulator 101-2, and plots 600-1, 600-2, 600-3 and 600-6 are at corners of second light modulator 101-2. Plots 600-0, 600-1, 600-2, 600-3, 600-6 will be interchangeably referred to hereafter, collectively, as plots 600 and generically as a plot 600. Further, both the x-axis and y-axis of each plot in FIG. 6 is over a range of about +/−500 µm.

In any event, each of red, green and blue ray fan plots for each of the tangential and sagittal planes show very different shapes in the center as compared to the corners of second light modulator 101-2. Plots 600-1, 600-2, 600-3, 600-4, show a classic ray-fan representation of spherical aberration. It is this spherical aberration that is corrected by the aspheric shape of the meniscus lens 121.

Figure 7:
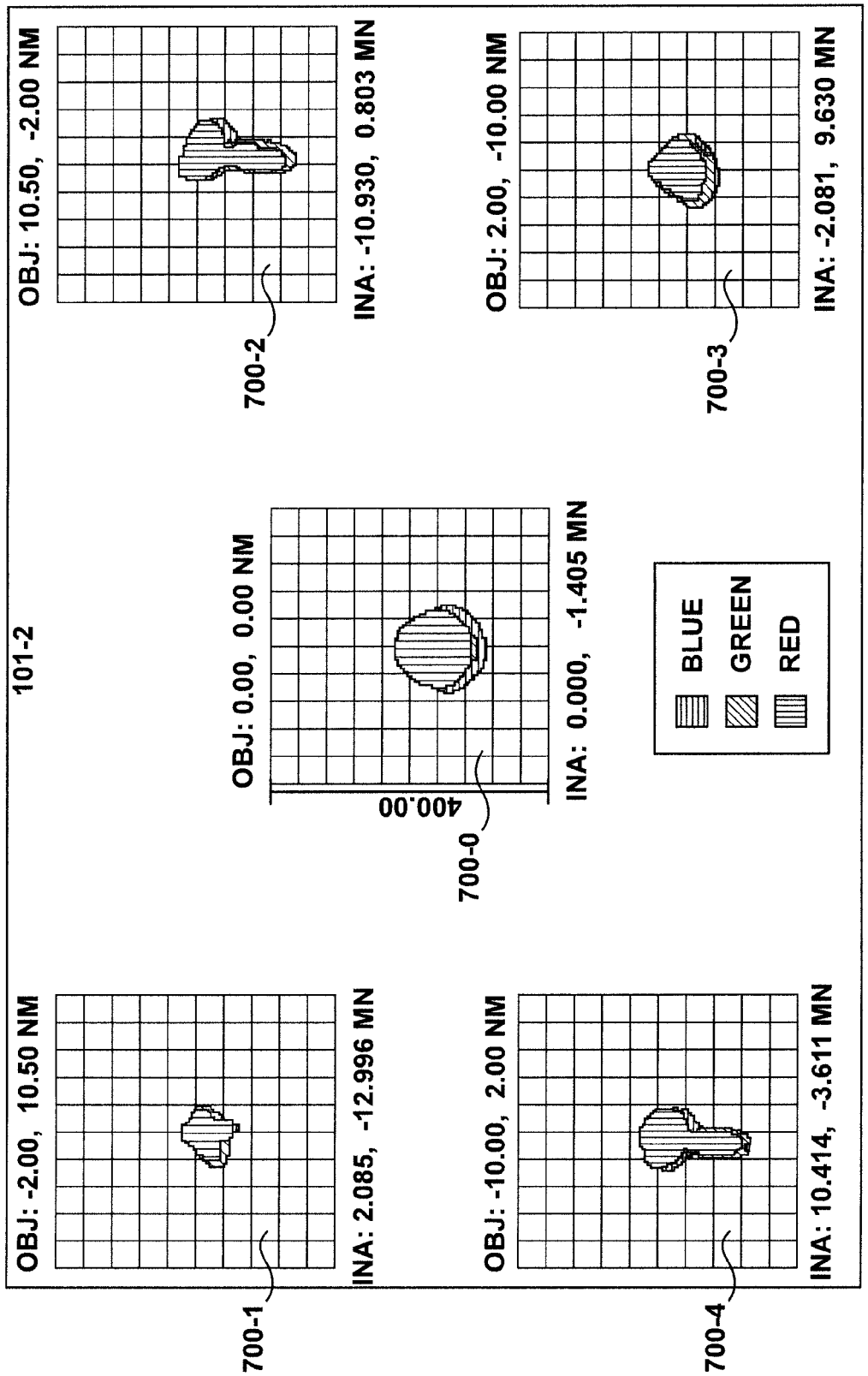
FIG. 7 depicts spot sizes at the center and corners of the second light modulator of the system of FIG. 1, with the offset of the negative meniscus lens axis removed, according to non-limiting implementations.

Attention is next directed to FIG. 7 which depicts plots of red, green and blue spot sizes of light rays at each of a center and corners of second light modulator 101-2, when offset 203 of optical axis 201 of negative meniscus lens 111 axis of air-spaced doublet 107 is removed from relay optics 103; components of system 100 are otherwise similar to those of FIGS. 3 and 4, described above. Plot 700-0 is at a center of second light modulator 101-2, and plots 700-1, 700-2, 700-3 and 700-4 are at corners of second light modulator 101-2. Plots 700-0, 700-1, 700-2, 700-3, 700-4 will be interchangeably referred to hereafter, collectively, as plots 700 and generically as a plot 700. Further, both the x-axis and y-axis of each plot in FIG. 7 is over a range of about 1000 μm.

In any event, comparing plot 700 with plots 300 it is apparent that coma is present and/or pronounced at second light modulator 101-2 as compared to plots 300. Hence, comparing plots 700 with plots 300, it is apparent that negative meniscus lens 111, offset from relay optical path 105, introduces coma into image 106 in a direction opposite that of coma introduced by the Schiempflug arrangement of light modulators 101.

Figure 8:
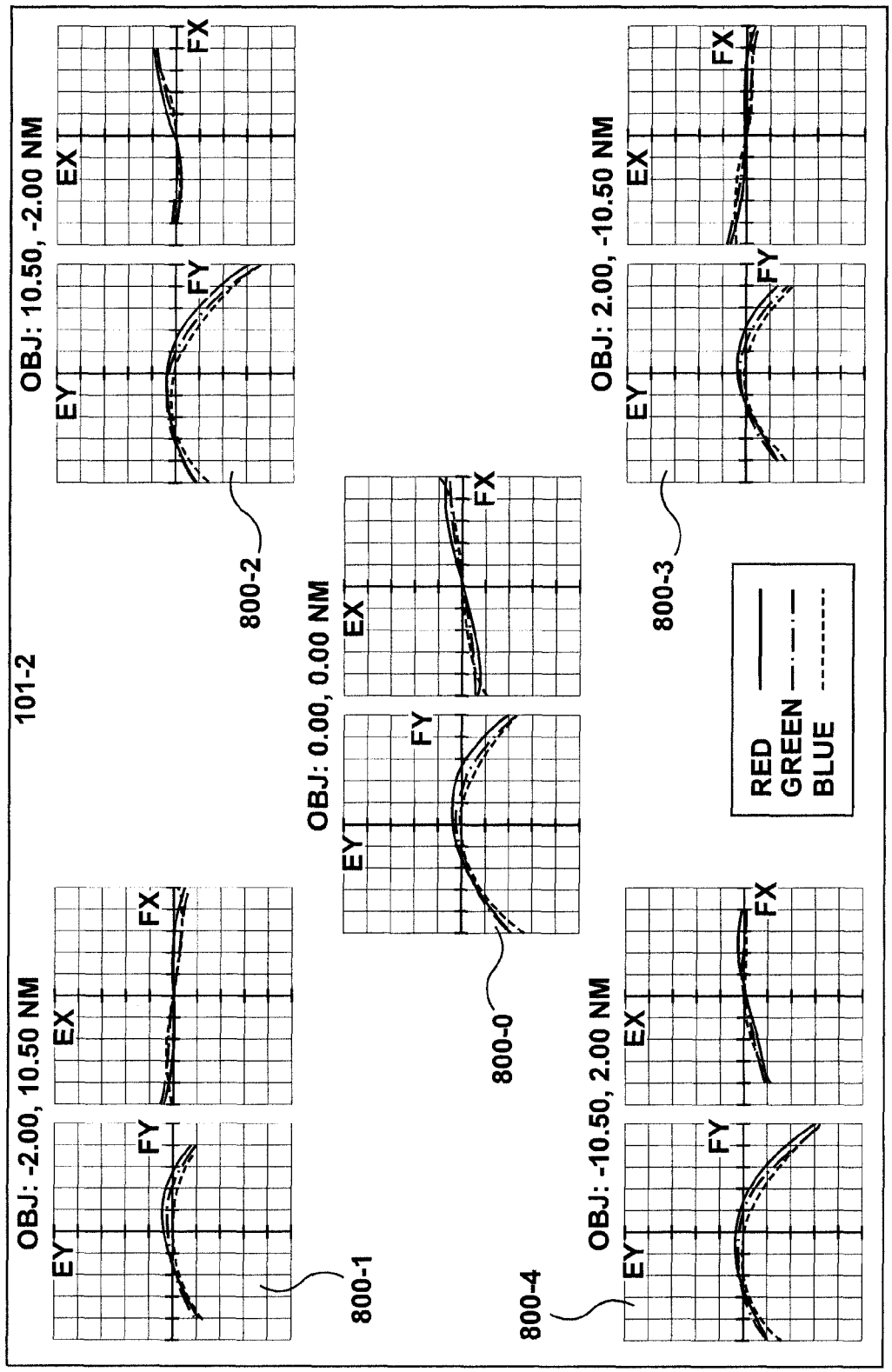
FIG. 8 depicts ray fan plots at the center and corners of the second light modulator of the system of FIG. 1, with the offset of the negative meniscus lens axis removed, according to non-limiting implementations.

Similarly, attention is next directed to FIG. 8, which depicts tangential and sagittal ray fan plots for each of the spots and/or plots 700 of FIG. 7. Hence, Plot 800-0 is at a center of second light modulator 101-2, and plots 800-1, 800-2, 800-3 and 800-8 are at corners of second light modulator 101-2. Plots 800-0, 800-1, 800-2, 800-3, 800-8 will be interchangeably referred to hereafter, collectively, as plots 800 and generically as a plot 800. Further, both the x-axis and y-axis of each plot in FIG. 8 is over a range of about +/−500 μm.

In any event, each of red, green and blue ray fan plots for the tangential planes show pronounced coma (i.e. the upside down smile shape of the tangential ray fan plots), which is eliminated and/or reduced when negative meniscus lens 111 is present in system 100, as is apparent from plots 800.

Figure 9:
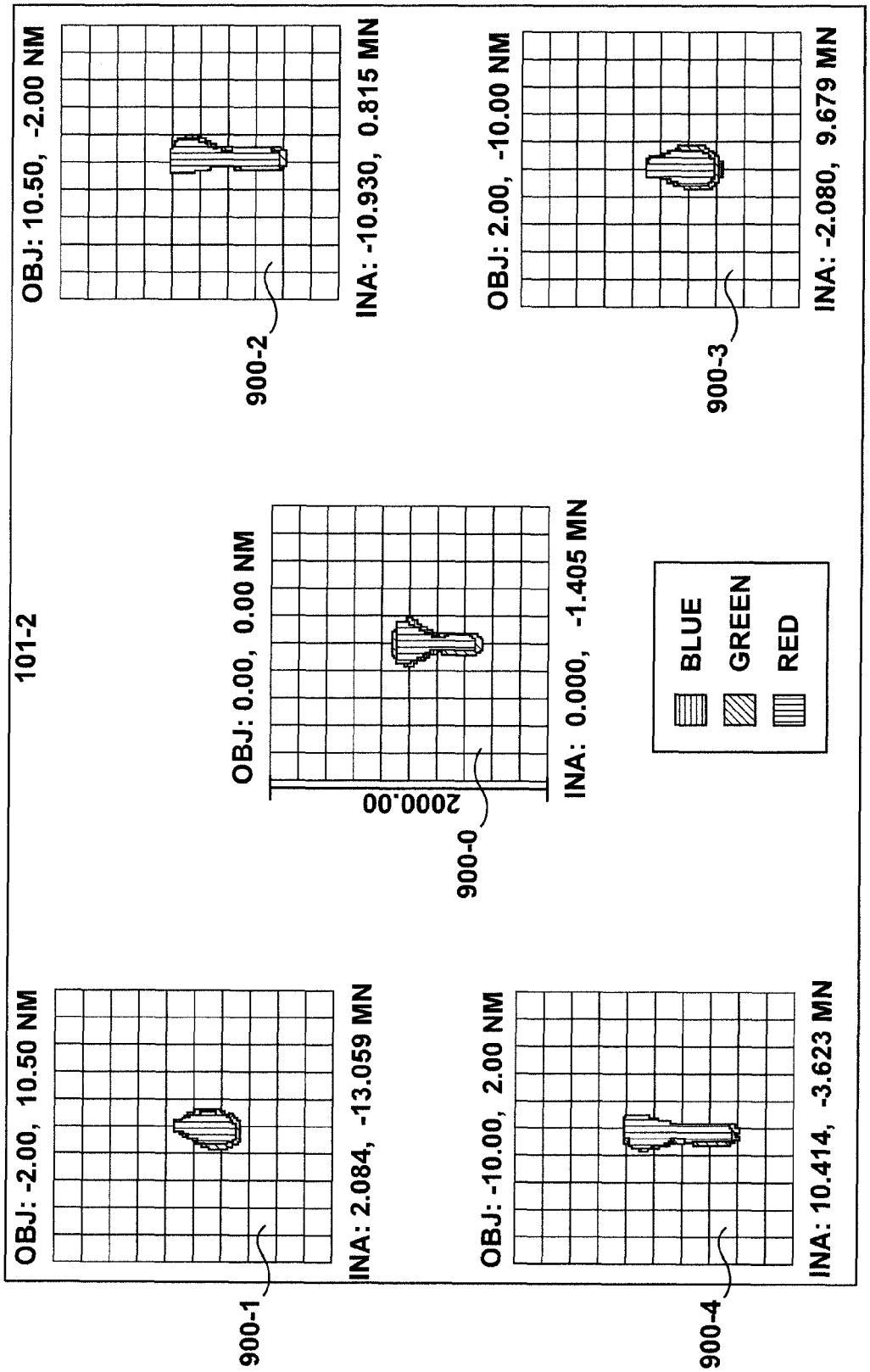
FIG. 9 depicts spot sizes at the center and corners of the second light modulator of the system of FIG. 1, with the pair of cylindrical lenses removed, according to non-limiting implementations.

Attention is next directed to FIG. 9 which depicts plots of red, green and blue spot sizes of light rays at each of a center and corners of second light modulator 101-2, when pair of cylindrical lenses 115 is removed from relay optics 103; components of system 100 are otherwise similar to those of FIGS. 3 and 4, described above. Plot 900-0 is at a center of second light modulator 101-2, and plots 900-1, 900-2, 900-3 and 900-4 are at corners of second light modulator 101-2. Plots 900-0, 900-1, 900-2, 900-3, 900-4 will be interchangeably referred to hereafter, collectively, as plots 900 and generically as a plot 900. Further, both the x-axis and y-axis of each plot in FIG. 9 is over a range of about 2000 μm.

In any event, comparing plot 900 with plots 300 it is apparent that astigmatism is present and/or pronounced across second light modulator 101-2 as compared to plots 300. Hence, comparing plots 900 with plots 300, it is apparent that pair of cylindrical lenses 115, introduces astigmatism into image 106 in a manner that offsets astigmatism introduced by the Schiempflug arrangement of light modulators 101.

Figure 10:
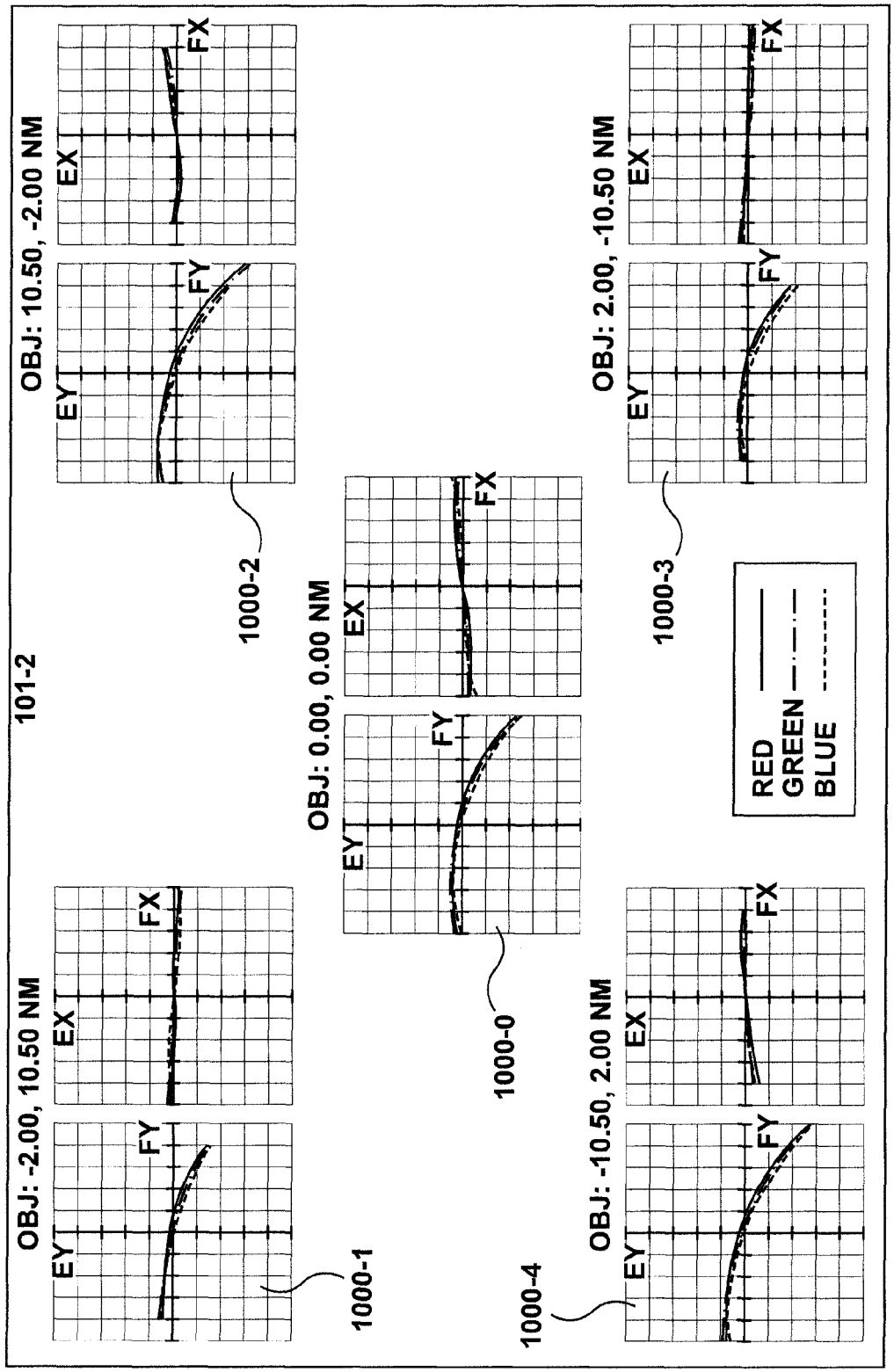
FIG. 10 depicts ray fan plots at the center and corners of the second light modulator of the system of FIG. 1, with the pair of cylindrical lenses removed, according to non-limiting implementations.

Similarly, attention is next directed to FIG. 10, which depicts tangential and sagittal ray fan plots for each of the spots and/or plots 900 of FIG. 9. Hence, Plot 1000-0 is at a center of second light modulator 101-2, and plots 1000-1, 1000-2, 1000-3 and 1000-4 are at corners of second light modulator 101-2. Plots 1000-0, 1000-1, 1000-2, 1000-3, 1000-4 will be interchangeably referred to hereafter, collectively, as plots 1000 and generically as a plot 1000. Further, both the x-axis and y-axis of each plot in FIG. 10 is over a range of about +/−1000 μm.

In any event, each of red, green and blue ray fan plots for the tangential planes show pronounced astigmatism (i.e. the right side of each of the tangential ray fan plots is lower than the respective left side), which is eliminated and/or reduced when pair of cylindrical lenses 115 is present in system 100, as is apparent from plots 1000.

Figure 11:
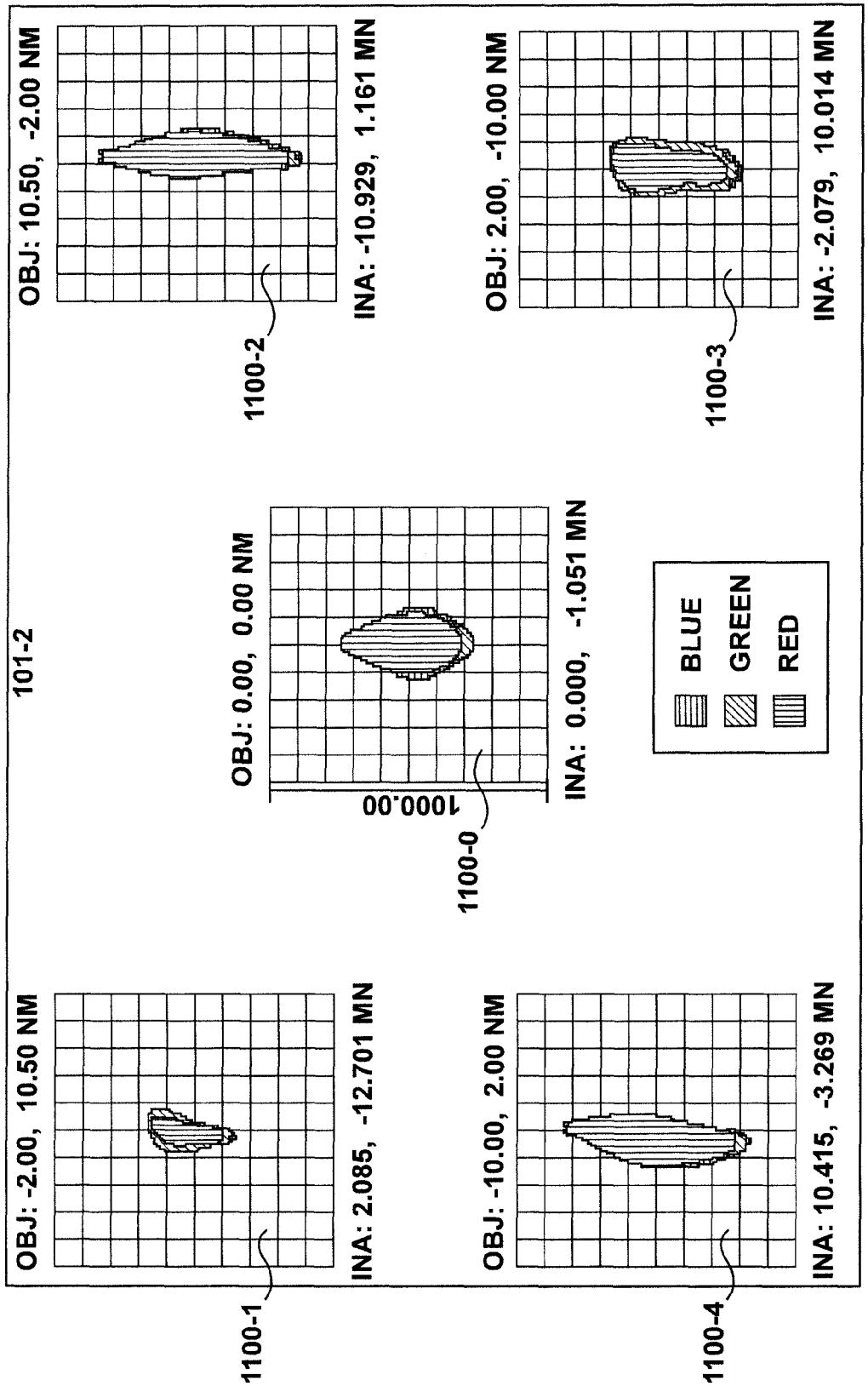
FIG. 11 depicts spot sizes at the center and corners of the second light modulator of the system of FIG. 1, with an air space between the pair of cylindrical lenses reduced as compared to FIG. 3, according to non-limiting implementations.
Figure 12:
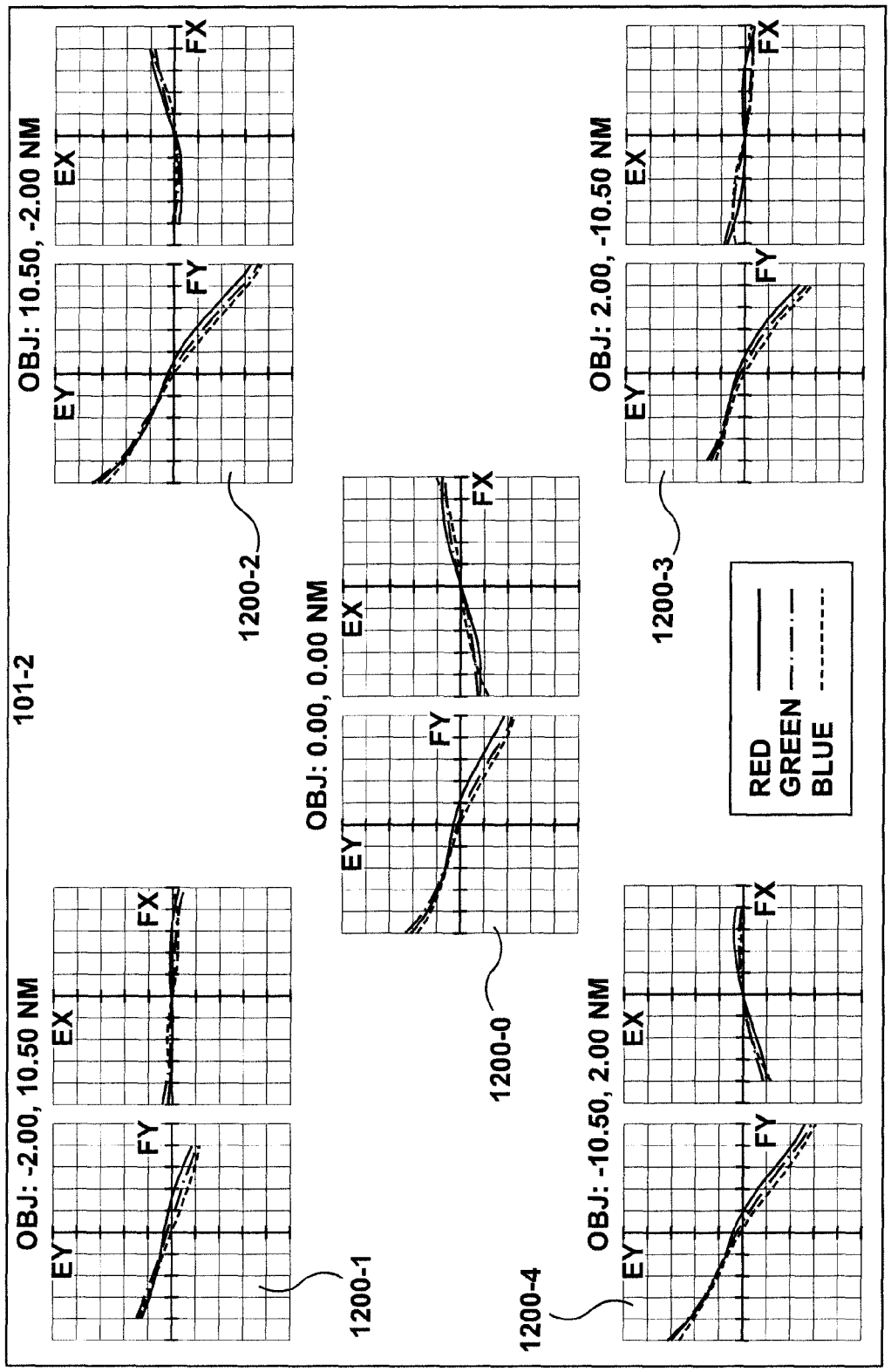
FIG. 12 depicts ray fan plots at the center and corners of the second light modulator of the system of FIG. 1, with an air space between the pair of cylindrical lenses reduced as compared to FIG. 4, according to non-limiting implementations.

The effect of air space 116 between pair of cylindrical lenses 115 is now described with reference to FIGS. 11-14. For example, in plots 300, 400, air space 116 is about 4 mm. In FIGS. 11 and 12, the effect on system 100 of changing air space 116 to about 2 mm is depicted; and in FIGS. 13 and 14, the effect on system 100 of changing air space 116 to about 8 mm is depicted.

Attention is next directed to FIG. 11 which depicts plots of red, green and blue spot sizes of light rays at each of a center and corners of second light modulator 101-2, when air space 116 between pair of cylindrical lenses 115 is about 2 mm; components of system 100 are otherwise similar to those of FIGS. 3 and 4, described above. Plot 1100-0 is at a center of second light modulator 101-2, and plots 1100-1, 1100-2, 1100-3 and 1100-4 are at corners of second light modulator 101-2. Plots 1100-0, 1100-1, 1100-2, 1100-3, 1100-4 will be interchangeably referred to hereafter, collectively, as plots 1100 and generically as a plot 1100. Further, both the x-axis and y-axis of each plot in FIG. 11 is over a range of about 2000 μm.

In any event, comparing plot 1100 with plots 300 it is apparent that astigmatism is present and/or pronounced across second light modulator 101-2 as compared to plots 300. Hence, comparing plots 1100 with plots 300, it is apparent that air space 116 of pair of cylindrical lenses 115 can be adjusted to increase or decrease astigmatism into image 106 in a manner that offsets astigmatism introduced by the Schiempflug arrangement of light modulators 101, as in plots 300.

Similarly, attention is next directed to FIG. 12, which depicts tangential and sagittal ray fan plots for each of the spots and/or plots 1100 of FIG. 11. Hence, Plot 1200-0 is at a center of second light modulator 101-2, and plots 1200-1, 1200-2, 1200-3 and 1200-4 are at corners of second light modulator 101-2. Plots 1200-0, 1200-1, 1200-2, 1200-3, 1200-4 will be interchangeably referred to hereafter, collectively, as plots 1200 and generically as a plot 1200. Further, both the x-axis and y-axis of each plot in FIG. 10 is over a range of about +/−500 μm.

In any event, each of red, green and blue ray fan plots for at least the tangential planes show pronounced astigmatism (i.e. the right side of each of the tangential ray fan plots is lower than the respective left side), which is eliminated and/or reduced when air space 116 between pair of cylindrical lenses 115 appropriately selected, as is apparent from plots 400.

Figure 13:
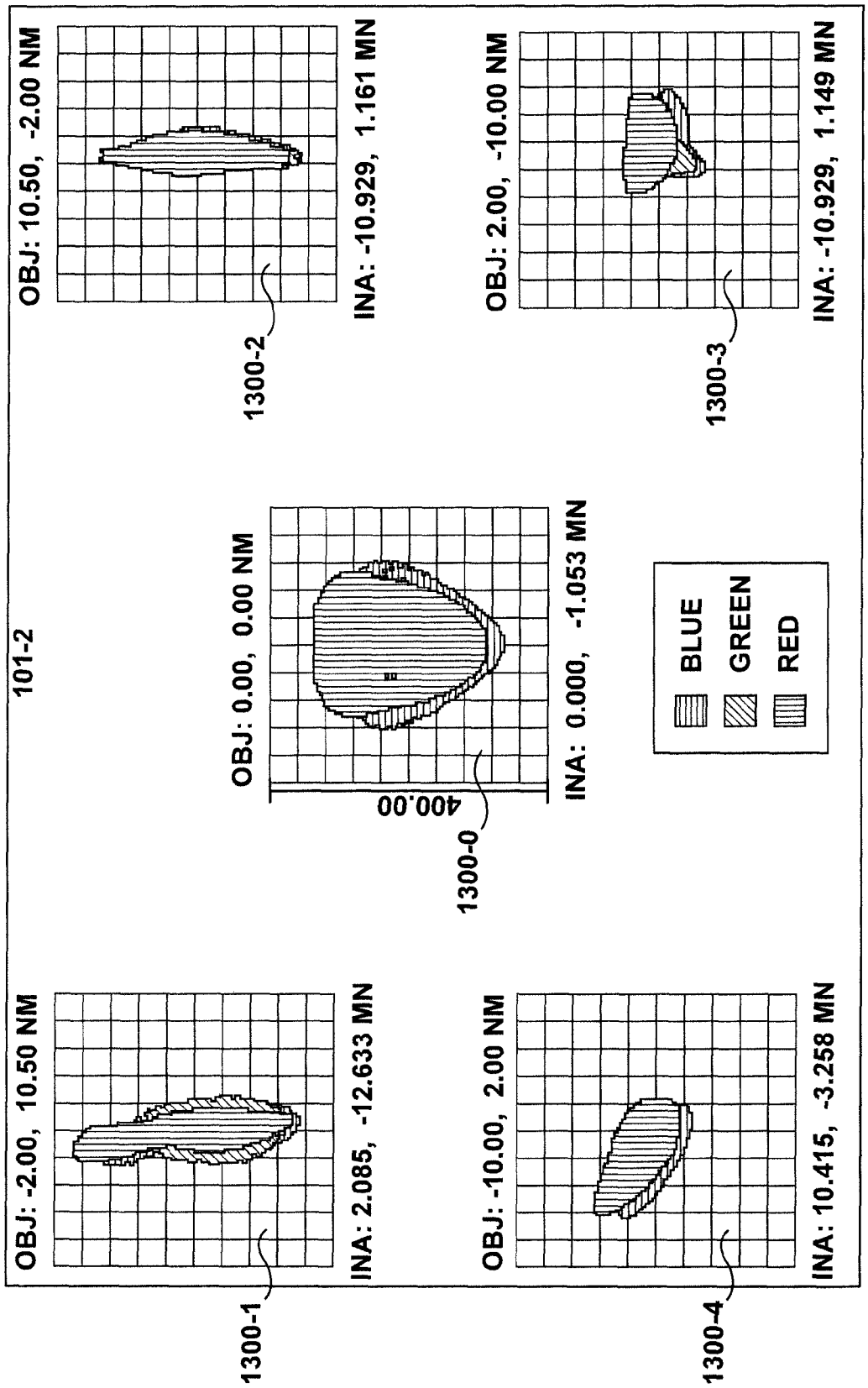
FIG. 13 depicts spot sizes at the center and corners of the second light modulator of the system of FIG. 1, with an air space between the pair of cylindrical lenses increased as compared to FIG. 3, according to non-limiting implementations.

Attention is next directed to FIG. 13 which depicts plots of red, green and blue spot sizes of light rays at each of a center and corners of second light modulator 101-2, when air space 116 between pair of cylindrical lenses 115 is about 8 mm; components of system 100 are otherwise similar to those of FIGS. 3 and 4, described above. Plot 1300-0 is at a center of second light modulator 101-2, and plots 1300-1, 1300-2, 1300-3 and 1300-4 are at corners of second light modulator 101-2. Plots 1300-0, 1300-1, 1300-2, 1300-3, 1300-4 will be interchangeably referred to hereafter, collectively, as plots 1300 and generically as a plot 1300. Further, both the x-axis and y-axis of each plot in FIG. 13 is over a range of about 400 μm.

In any event, comparing plot 1300 with plots 300 it is apparent that astigmatism is present and/or pronounced across second light modulator 101-2 as compared to plots 300. Hence, comparing plots 1300 with plots 300, it is apparent that air space 116 of pair of cylindrical lenses 115 can be adjusted to increase or decrease astigmatism into image 106 in a manner that offsets astigmatism introduced by the Schiempflug arrangement of light modulators 101, as in plots 300. While the amount of astigmatism is not uniform over the image due to field curvature, in general astigmatism is corrected as uniformly as possible, within design constraints of system 100, by selecting and/or adjusting and/or changing a size of air space 116 between pair of cylindrical lenses 115.

Figure 14:
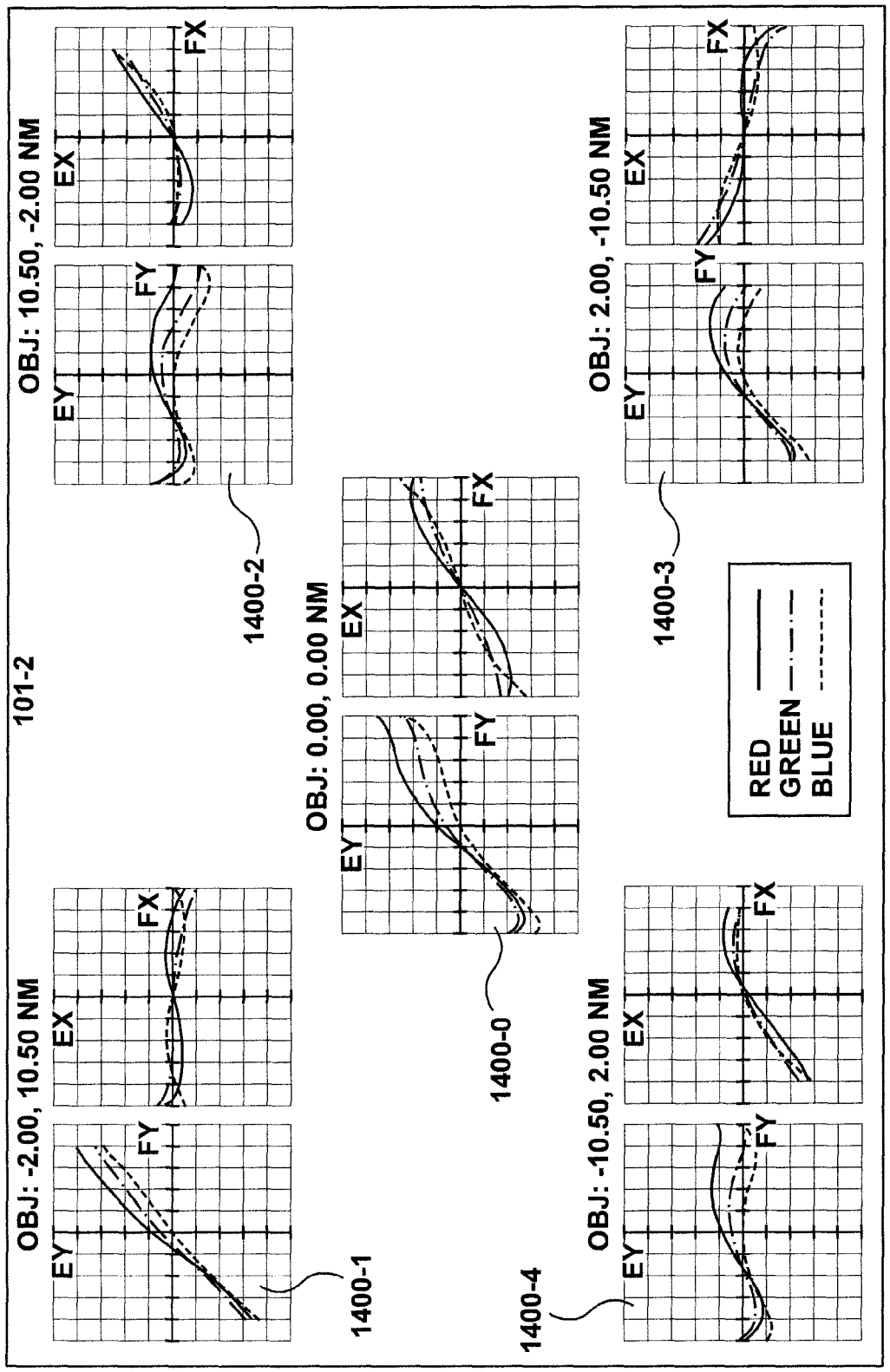
FIG. 14 depicts ray fan plots at the center and corners of the second light modulator of the system of FIG. 1, with an air space between the pair of cylindrical lenses increased as compared to FIG. 4, according to non-limiting implementations.

Similarly, attention is next directed to FIG. 14, which depicts tangential and sagittal ray fan plots for each of the spots and/or plots 1100 of FIG. 11. Hence, Plot 1400-0 is at a center of second light modulator 101-2, and plots 1400-1, 1400-2, 1400-3 and 1400-4 are at corners of second light modulator 101-2. Plots 1400-0, 1400-1, 1400-2, 1400-3, 1400-4 will be interchangeably referred to hereafter, collectively, as plots 1400 and generically as a plot 1400. Further, both the x-axis and y-axis of each plot in FIG. 10 is over a range of about +/−500 μm.

In any event, each of red, green and blue ray fan plots for at least the tangential planes show pronounced astigmatism (i.e. the left side of each of the tangential ray fan plots is lower than the respective left side), which is eliminated and/or reduced when air space 116 between pair of cylindrical lenses 115 appropriately selected, as is apparent from plots 400.

In any event, disclosed herein is a light modulator system including relay optics for correcting optical distortions. An air-spaced doublet comprising two optical components with a shifted optical axis is used to introduce coma into the system to offset coma introduced by image and object light modulators being at an off-normal angle; similarly, a pair of cylindrical lenses is used to introduce astigmatism into the system in a manner that offsets astigmatism introduced by the off-normal light modulators. A pair of meniscus aspheric lenses can be used to further correct for, and/or introduce, spherical aberrations, and/or correct for prismatic colour separation.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system comprising:
a first light modulator, a second light modulator, and relay optics there between, each of the first light modulator and the second light modulator at an off-normal angle to a relay optical path through the relay optics such that some portions of an image, formed by the first light modulator, are relayed through the relay optics to the second light modulator, at different path respective path lengths than other portions of the image, thereby introducing coma and astigmatism into the image,
the relay optics comprising:
an air-spaced doublet comprising: a biconvex lens and a negative meniscus lens, an optical axis of the air-spaced doublet offset between the biconvex lens and the negative meniscus lens, each of the biconvex lens, the negative meniscus lens, an air space there between and an offset of the optical axis there between are selected to adjust the coma in the image; and,
a pair of cylindrical lenses, cylindrical with the relay optical path, each of the pair of cylindrical lenses, and a respective air space there between, selected to adjust the astigmatism in the image.

2. The system of claim 1, wherein a concave side of the negative meniscus lens is adjacent the biconvex lens.

3. The system of claim 1, wherein a curvature of a side of negative meniscus lens, closest to the biconvex lens, is about complimentary with an adjacent side of the biconvex lens.

4. The system of claim 1, wherein each of the biconvex lens, the negative meniscus lens, an air space there between and the offset there between are selected to adjust the coma in the image by introducing respective coma into the image in a direction opposite the coma in the image introduced by the off-normal angle.

5. The system of claim 1, wherein one of the biconvex lens and the negative meniscus lens is cylindrical with the relay optical path.

6. The system of claim 1, wherein the biconvex lens comprises opposite sides of different curvatures.

7. The system of claim 1, wherein the air space between the air-spaced doublet is one or more of about 2 mm and between about 1 mm and about 10 mm.

8. The system of claim 1, wherein the pair of cylindrical lenses are located between the air-spaced doublet and the second light modulator.

9. The system of claim 1, further comprising apparatus for adjusting a size of the respective air space between the pair of cylindrical lenses.

10. The system of claim 1, wherein each of the pair of cylindrical lenses, and the respective air space there between, are selected to adjust the astigmatism in the image between a center of the image and corners of the image.

11. The system of claim 1, wherein a first cylindrical lens, of the pair of cylindrical lenses, comprises a plano-concave cylindrical lens, and a second cylindrical lens, of the pair of cylindrical lenses, comprises a plano-convex cylindrical lens.

12. The system of claim 11, wherein a respective concave side and a respective convex side of each of the pair of cylindrical lenses face towards each other.

13. The system of claim 1, wherein the respective air space between the pair of cylindrical lenses is between about 3 mm and about 10 mm.

14. The system of claim 1, wherein the relay optics further comprise a pair of meniscus aspheric lenses, cylindrical with the relay optical path, the air-spaced doublet and the pair of cylindrical lenses located between the pair of meniscus aspheric lenses, the pair of meniscus aspheric lenses selected to control one or more of spherical aberration, field curvature and prismatic colour separation of the image being relayed through the relay optics.

15. The system of claim 14, wherein the aspheric meniscus lenses are identical to each other.

16. The system of claim 14, wherein a respective convex side of each of the meniscus aspheric lenses face towards each other.

17. The system of claim 1, further comprising a first set of prisms configured to: relay input light to the first light modulator at a normal angle and relay the image from the first light modulator at the off-normal angle.

18. The system of claim 1, further comprising a second set of prisms configured to: relay the image from the relay optics to the second light modulator at the off-normal angle and relay a respective image formed at the second light modulator out of the system at a normal angle.

19. The system of claim 1, wherein the off-normal angle is one or more of between about 24° and about 28°, and at about 26°.

20. The system of claim 1, wherein the relay optics further comprises a reflector for rotating the image by about 90° along the relay optical path.

21. The system of claim 20, wherein the reflector is located between the air-spaced doublet and the pair of cylindrical lenses.

\* \* \* \* \*